Figure 4:
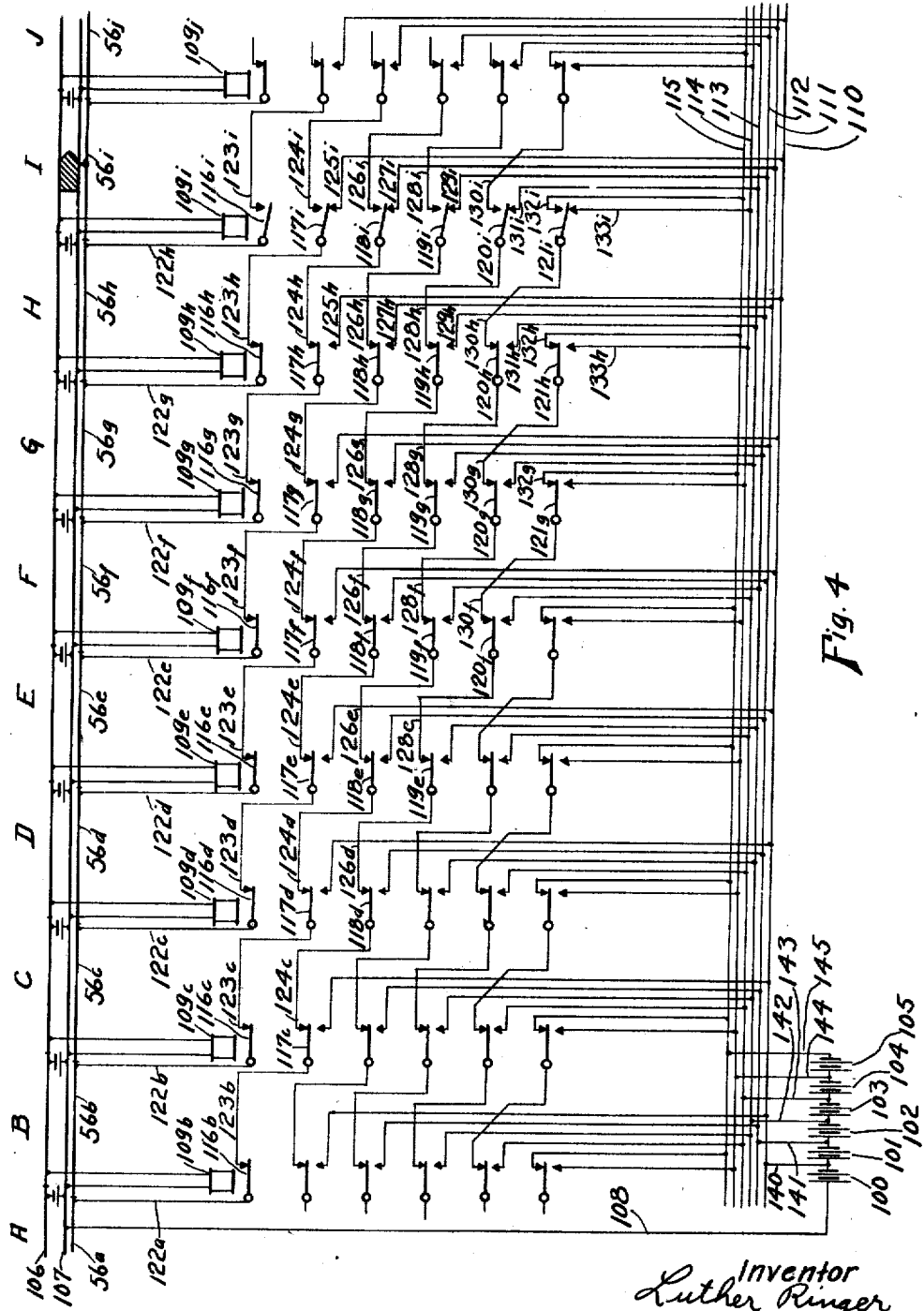

L. RINGER.
AUTOMATIC SPEED CONTROL SYSTEM.
APPLICATION FILED SEPT. 10, 1917.
1,317,727.  Patented Oct. 7, 1919.
3 SHEETS—SHEET 1.
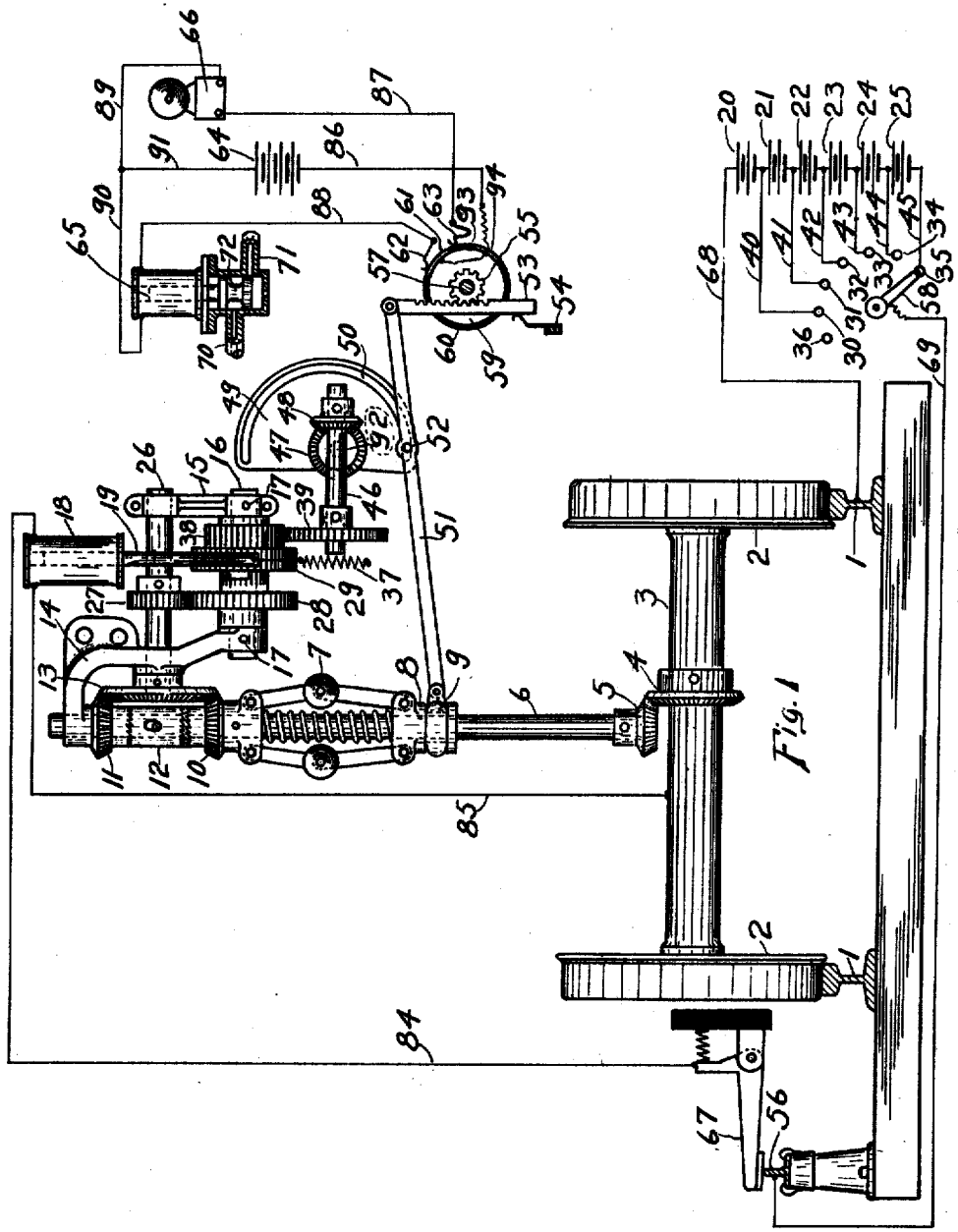
Inventor
Luther Ringer
by
Lyman E. Dodge
Attorney L. RINGER.
AUTOMATIC SPEED CONTROL SYSTEM.
APPLICATION FILED SEPT. 10, 1917.
1,317,727.
Patented Oct. 7, 1919.
3 SHEETS—SHEET 2.
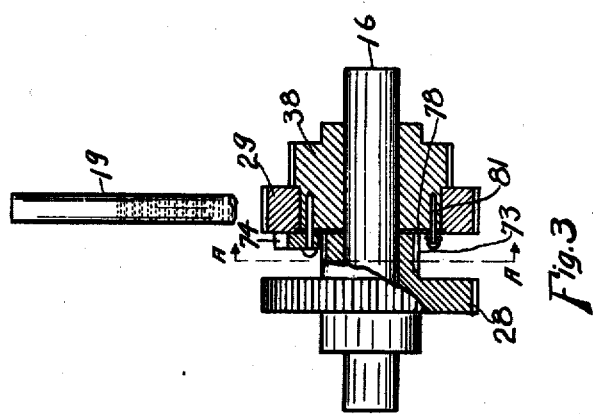
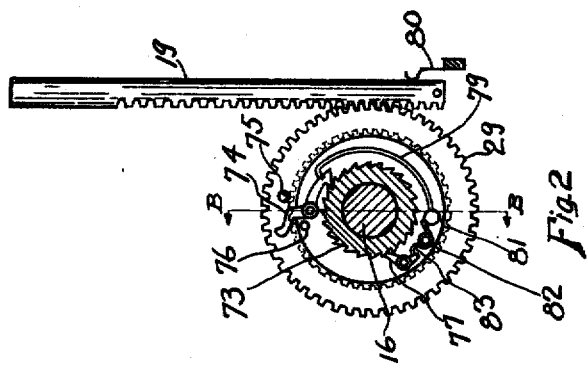
Inventor
Luther Ringer
by
Lyman E. Dodge
Attorney

UNITED STATES PATENT OFFICE.

LUTHER RINGER, OF BUFFALO, NEW YORK, ASSIGNOR TO SIMMEN AUTOMATIC RAILWAY SIGNAL COMPANY, OF BUFFALO, NEW YORK, A CORPORATION OF ARIZONA.

AUTOMATIC SPEED-CONTROL SYSTEM.

1,317,727.  Specification of Letters Patent.  Patented Oct. 7, 1919.

Application filed September 10, 1917. Serial No. 190,498.

*To all whom it may concern:*

Be it known that I, LUTHER RINGER, a citizen of the United States, residing at Buffalo, in the county of Erie and State of New York, have invented certain new and useful Improvements in Automatic Speed-Control Systems, of which the following is a specification.

This invention relates to automatic speed control systems for controlling the speed of moving vehicles.

The object of this invention is to provide a system by which the speed of a moving vehicle may be automatically controlled so as to prevent the vehicle from exceeding a speed which is safe for the particular condition of the track over which the vehicle is running. More specifically, this invention relates to a speed control device in which continuous influences outside the vehicle move and maintain the speed control mechanism in various positions as the train moves along the trackway. The speed control mechanism includes a permissible speed device, which may be set in a plurality of positions and the devices on the vehicle are so arranged that when the permissible speed device is moved from a given permissible speed position to a lower permissible speed position, such movement is not suddenly made, but is so accomplished that the reduction of the permissible speed for the vehicle is in accordance with its normal braking curve for the vehicle.

Other objects and advantages will appear as the description of the invention progresses and the novel features will be particularly pointed out in the appending claims.

In describing the invention in detail, reference is had to the accompanying drawings, wherein I have illustrated a preferred physical embodiment of my invention, and wherein like characters of reference designate corresponding parts throughout the several views, and in which—

Figure 1 is a diagrammatic view of the vehicle carried devices together with means for operating said devices. Fig. 2 is a detail and enlarged view of parts of the vehicle carried devices, this view being a section along the line A, A of Fig. 3 looking in the direction of the arrows. Fig. 3 is a sectional view along the line B, B of Fig. 2 looking in the direction of the arrows. Fig. 4 is a diagrammatic view of a trackway, having automatic means for operating the vehicle carried devices.

Referring to Fig. 1, 1, 1 are the rails upon which the vehicle is adapted to travel. 2, 2 are the wheels of the vehicle and 3 its axle. 4 is a bevel gear rigidly mounted on the axle 3 and adapted to mesh with a bevel gear 5, which is rigidly mounted on a vertical shaft 6. The shaft 6 is suitably supported in bearings, one of which is included in the bracket 14. Mounted upon the shaft 6 is a centrifugal governor 7, having its upper collar attached to the shaft 6, its lower collar 8 being slidably mounted thereon. Near the upper end of the shaft 6 are rotatably mounted two bevel gears 10 and 11, both of these gears meshing with a bevel gear 13 which is rigidly attached to the shaft 26. Mounted on the shaft 6 between the bevel gears 10 and 11 is a collar 12 which is prevented from rotating with respect to the shaft 6, but it may slide vertically upon said shaft. The collar 12 has at its upper end a series of teeth which mesh with like teeth on the bevel gear 11 when the shaft 6 revolves in one direction. On the lower end of the collar 12 are a series of teeth which mesh with the bevel gear 10 when the shaft 6 rotates in the opposite direction. The object of the bevel gears 10, 11 and 13 and the collar 12 is to cause the shaft 26 to rotate in the same direction when the shaft 6 rotates in either direction.

The shaft 26 is rotatably mounted in suitable bearings in brackets 14 and 15. As has heretofore been mentioned, the bevel gear 13 is rigidly secured to this shaft and there is also rigidly secured to this shaft a spur gear 27 which meshes with the gear 28. The gear 28 is rotatably mounted upon a shaft 16. The shaft 16 is suitably supported in bearings formed in the brackets 14 and 15 and is prevented from rotating therein by the pins 17. There are also mounted upon the shaft 16, other gears and coöperating devices including the gear 29. Adjacent to the gear 29 is a plunger 19. This plunger acts as the core of the solenoid 18.

Referring to Figs. 2 and 3 it will be seen that the gear 28 has integral therewith a ratchet wheel 73. Rotatably mounted upon the shaft 16 adjacent to the ratchet wheel 72 is a gear 38. Rotatably mounted upon another gear 29. The said gear 29 is prevented from moving longitudinally with respect to the gear 38 by a retaining ring 78. The lower end of the plunger 19 is provided with teeth, said teeth comprising a rack which meshes with the teeth of the gear 29, and the spring 80 causes the teeth on the plunger 19 to remain constantly in mesh with the gear 29. Pivotally mounted on the face of the gear 38 which is adjacent to the ratchet wheel 73 is a pawl 74, which is adapted under certain circumstances to engage the teeth of the ratchet wheel 73. The pawl 74 has an upwardly extending arm which is adapted to coöperate with the pin 76 attached to the face of the gear 38 and pin 75 attached to the face of the gear 29. The contact of the pawl 74 with the teeth of the ratchet wheel 73, is promoted by the spring 79 which is pivotally mounted upon the pin 81 which is secured to the face of the gear 38. Also pivotally mounted on the face of the gear 38, which is adjacent to the ratchet wheel 73 is a pawl 77. The pawl 77 has two arms, one of which touches the teeth of the ratchet wheel 73, and against the other of which presses a spring 83 which is pivotally mounted on a pin 82 secured to the face of the gear 38. The other end of the spring 83 presses against the pin 81.

The gear 38 is in mesh with a gear 39 which is rigidly attached to the shaft 46. Also rigidly attached to the shaft 46 is a bevel gear 48 which meshes with a bevel gear 47 rigidly attached to another shaft 92. Also rigidly attached to the shaft 92 is a cam member 49 which has a groove 50 in which a roller 52 is adapted to operate. The roller 52 is pivotally mounted on a floating lever 51. Pivotally attached to one end of the floating lever 51 is an annular ring 9 which surrounds the lower collar 8 of the governor 7. Pivotally attached to the other end of the floating lever 51 is a member 53 which has teeth which constitute a rack and which mesh with a gear 55 rigidly secured to the shaft 57. The meshing of the teeth on the member 53 with the gear 55 is promoted by the spring 54 which bears against the member 53. Also rigidly secured to the shaft 57 is a drum 59, whose surface is divided into two insulating sections 60 and 93 and two conducting surfaces 61 and 94. A contact spring 62 normally touches the conducting surface 61 and a contact spring 63 normally touches the insulating surface 93.

Located at a suitable place on the vehicle is a battery or other source of electric energy 64. Located in the train line air pipe is an air valve 72, which is controlled by an electromagnet 65. The plunger of the electromagnet 65 forms the stem of the valve 72, and when the electromagnet 65 is energized the pressure of the train pipe is communicated to the chamber surrounding the valve piston, but when the electromagnet 65 is deënergized, the valve piston drops to a lower position so that the chamber surrounding it communicates with the train pipe 70 and also with the atmosphere through the pipe 71, thus causing a reduction in the train pipe pressure and an application of the brakes. 66 is an electric bell or warning signal. 67 is a shoe hingedly mounted at a convenient place on the vehicle and adapted to contact with the third rail 56. The third rail 56 is mechanically continuous, but may be electrically divided into sections by suitable insulating joints.

Located near the track are a series of batteries 20, 21, 22, 23, 24 and 25. The battery 20 has one terminal connected to the track rail 1 by the wire 68. The other terminal of the battery 20 is connected to the opposite terminal of the battery 21, and the connecting point of these two batteries is connected by the wire 40 with the contact point 30. Similarly the batteries 20, 21, 22, 23, 24 and 25 are all connected in series, the connecting point of the batteries 21 and 22 being connected by wire 41 to the contact point 31, the connecting point of the batteries 22 and 23 being connected by the wire 42 with the contact point 32, the connecting point of the batteries 23 and 24 being connected by the wire 43 with the contact point 33, the connecting point of the batteries 24 and 25 being connected by the wire 44 with the contact point 34 and the opposite terminal of the battery 25 being connected by the wire 45 with the contact point 35. The contact point 36 is not connected with any of the batteries 20, 21, 22, 23, 24 or 25. The arm 58 is adapted to be moved so as to contact with any of the contact points 30, 31, 32, 33, 34, 35 or 36, and the arm 58 is connected by the wire 69 with the third rail 56. It will be obvious that when the arm 58 is touching the contact point 36 there will be no difference of potential between the third rail 56 and the track rail 1. When the arm 58 is touching the contact 30, the difference of potential between the third rail 56 and the running rail 1 will be equal to the voltage of the battery 20. When the arm 58 is touching the contact point 31 the said difference of potential will be equal to the combined voltage of the batteries 20 and 21. When the arm 58 is touching the contact point 32, the said difference of potential will be equal to the combined voltage of the batteries 20, 21 and 22. When the arm 58 is touching the contact point 33, the said difference of potential will be equal to the combined voltage of the batteries 20, 21, 22 and 23. When the arm 58 is touching the contact point 34, the said difference of potential will be equal to the combined voltage of the batteries 20, 21, 22, 23 and 24, and when the arm 58 is touching the contact point 35, the said difference of potential will be equal to the combined voltage of the batteries 20, 21, 22, 23, 24 and 25.

The operation of this device is as follows: The solenoid 18 is so designed that when current of varying strength passes through this solenoid, its plunger 19 will be attracted to and held at various positions. If the full current strength passes through the solenoid, the plunger 19 will move to its highest position, but for different lower strengths of current the plunger 19 will assume various positions between its highest position and its lowest position at which it stands when no current is applied to the electromagnet. It will be observed that the plunger 19 is raised against the tension of a spring 37, and that this spring 37 acts to lower the plunger when the current in the electromagnet decreases. The air valve electromagnet 65 is normally energized through the following circuit: from the positive side of the battery 64 to the wire 86, conducting section 61 of the drum 59, contact spring 62, wire 88, electromagnet 65, wires 90 and 91 to the negative side of the battery 64.

Assuming that the arm 58 is touching the contact point 35, the difference of potential between the third rail 56 and the track rail 1 will be equal to the combined voltage of the batteries 20, 21, 22, 23, 24 and 25. Therefore current will flow through the electromagnet 18 through the following circuit: from the third rail 56 to the shoe 67, wire 84, electromagnet 18, wire 85, axle 3, wheel 2, track rail 1, back to the batteries. This will cause the plunger 19 to assume its highest position. Assuming the arm 58 is in contact with the contact point 34, the electromagnet 18 will then be energized only by the combined voltage of the batteries 20, 21, 22, 23 and 24 and the plunger 19 will assume a lower position. It will be seen that as the arm 58 touches the various contact points 33, 32, 31 and 30 lower voltage will be applied to the electromagnet 18, and as each of these contact points is touched, the plunger 19 will assume correspondingly lower positions. When the arm 58 is in contact with the contact point 36, the electromagnet 18 will be deënergized, and the plunger 19 will assume its lowest position.

For each position of the plunger 19, there is a corresponding position for the cam 49. The plunger 19 is held in a given position by the electric current which is flowing in the electromagnet 18. This results in the gear 29 being held in a corresponding position. As the ratchet wheel 73 is always rotating in a clockwise direction (as shown in Fig. 2) when the vehicle is moving, the upper arm of the pawl 74 is brought into contact with the pin 75. This forces the pawl 74 out of contact with the teeth of ratchet wheel 73, and the upper arm of the pawl 74 against the pin 76. This produces a locking effect which locks the gears 29 and 38 together and holds the cam 49 in a position corresponding to the position of the plunger 19.

If now, a higher voltage is applied to the electromagnet 18, the plunger 19 is drawn to a higher position. This causes the gear 29 to be rotated in the counter-clockwise direction. Rotating the gear 29 in this direction maintains the pressure of the pin 75 on the upper arm of the pawl 74, the locking effect heretofore described persists, and the cam 49 is moved to a higher permissible speed position simultaneously with the movement of the plunger 19.

If now a lower voltage is applied to the electromagnet 18, the plunger 19 is dropped to a lower position. This causes the gear 29 to be rotated in the clockwise direction. Rotating the gear 29 in this direction moves the pin 75 out of contact with the upper arm of the pawl 74, and the pawl 74 then drops into contact with the teeth of the ratchet wheel 73. The cam 49 is then driven to a lower permissible speed position in accordance with the movement of the vehicle by means of the following gear train: the axle 3, gear 4, gear 5, shaft 6, gear 10 or 11, according to the direction of the vehicle, gear 13, shaft 26, gear 27, gear 28, ratchet wheel 73, which is now connected to the gear 38 by the pawl 74, gear 39, shaft 46, gear 48, gear 47 and shaft 92 upon which the cam 49 is mounted.

When the cam 49 has reached the position which corresponds to the position of the plunger 19, the locking effect which has heretofore been described, will again take place.

It will be noted that when a downward movement of the plunger 19 first takes place, there will be a short interval before the pawl 74 drops into contact with the teeth of the ratchet wheel 73. The pawl 77 prevents the gear 38 from turning with the gear 29 during this interval.

It will be obvious from this description that any upward movement of the plunger 19 moves the cam 49 at the same time to a position corresponding to the new position taken by the plunger 19, but any downward movement of the plunger 19 results in the cam assuming a position corresponding to the new position taken by the plunger 19, said position being reached however, only in accordance with the movement of the train.

The slot 50 in the cam 49 and in which the roller 52 operates, is designed in accordance with a speed-distance curve, which would represent the performance of the train in making a normal service application of the brakes. As shown in Fig. 1, the cam is in its maximum position, and it will be observed that under these circumstances the floating lever 51 will be rotated about the roller 52 as a pivot as the speed of the train increases and decreases, and the lower collar 8 of the governor 7 moves correspondingly up and down. This will cause the drum 59 to be rotated as the speed of the vehicle changes, and it will be noted that after considerable rotation in the counter clockwise direction as viewed in Fig. 1, which occurs when the speed increases, the contact spring 63 will pass from the insulated section 93 to the conducting section 94 of the drum 59. Assuming the speed of the vehicle to be constant and therefore the lower collar 8 of the governor 7 to remain in a constant position, and further assuming that the cam 49 is being moved from a given permissible speed position to a lower permissible speed position, it will be noted that the floating lever 51 will then be rotated about the pivot by which it is joined to the ring 9. This will also cause a counter clockwise rotation of the drum 59. It will therefore be observed that such a counter clockwise rotation of the drum 59 may be caused either by an increase in speed of the vehicle or by moving the cam 49 from a given permissible speed position to a lower permissible speed position, or by a combination of both. It will also be observed that when the cam 49 is in its maximum permissible speed position the speed of the vehicle can be higher before the contact spring 63 is brought into contact with the conducting section 94 than when the cam 49 is in a lower permissible speed position. When the cam 49 is in its minimum position the contact spring 62 will be touching the insulated section 93 of the drum 59. The air brakes will therefore be applied and the vehicle will be forced to stop and remain at a standstill until the third rail is again energized. The insulated and the conducting sections of the drum 59 and the contact springs 62 and 63 are so arranged that the contact spring 63 makes contact with the conducting section 94 while the contact spring 62 is still making contact with the conducting section 61. But after the contact spring 63 is touching the conducting section 94, a further movement of the drum 59 in the counter-clockwise direction will cause the contact spring 62 to touch the insulated section 93. The circuits operated by these movements of the contact drum 59 are as follows: When the contact spring 63 touches the conducting section 94 a circuit is closed through the warning signal 66 as follows: from the positive side of the battery 64 to the wire 86, conducting section 94, contact spring 63, wire 87, warning signal 66, wires 89 and 91 to the negative side of the battery 64. If a further movement of the cam 49 or a further increase in speed of the vehicle causes sufficient rotation of the drum 59 for the contact spring 62 to touch the insulated section 93, the circuit for the electromagnet 65, which has heretofore been described, will be opened and the valve 72 will drop to its lower position, causing an automatic application of the brakes.

From the above description it will be obvious that the speed control system herein described consists of a means for imposing a varying permissible speed on a vehicle as it moves along a trackway. When the voltage on the third rail is increased, the permissible speed device is immediately moved to a higher permissible speed position, and when the voltage on the third rail is decreased, the permissible speed device is moved to a lower permissible speed position, the movement from the higher permissible speed position to the lower permissible speed position being in accordance with the normal service braking curve. If at any time the actual speed of the vehicle exceeds the permissible speed, which is determined by the position of the permissible speed device at that particular time, a warning signal is sounded, and if the engineer does not then apply his brakes, a further movement of the permissible speed device or a further increase in the actual speed of the vehicle will result in an automatic application of the brakes.

In Fig. 4 I have shown means for automatically controlling the energization of the third rail. 106 and 107 are the rails of a trackway, the rail 107 being continuous and the rail 106 being divided by suitable insulating joints into blocks, A, B, C, D, E, F, G, H, I and J. The third rail 56 is divided into corresponding sections 56$^a$, 56$^b$, 56$^c$, 56$^d$, 56$^e$, 56$^f$, 56$^g$, 56$^h$, 56$^i$ and 56$^j$. At a convenient place adjacent to the trackway are a series of batteries 100, 101, 102, 103, 104, and 105. The battery 100 has one terminal connected by the wire 108 with the track rail 107 and the other terminal of the battery 100 is connected to the opposite terminal of the battery 101, and the connecting point of these batteries is connected by the wire 140 with a line wire 110 which runs adjacent to the trackway. Similarly the line wires 110, 111, 112, 113, 114 and 115 are carried along the trackway and are connected to the batteries 100, 101, 102, 103, 104 and 105 so that the following conditions exist:—The difference of potential between the line wire 110 and the track rail 107 is equal to the voltage of the battery 100. The difference of potential between the line wire 111 and the track rail 107 is equal to the combined voltage of the batteries 100 and 101. The difference of potential between the line wire 112 and the track rail 107 is equal to the combined voltage of the batteries 100, 101 and 102. The difference of potential between the line wires 113 and the track rail 107 is equal to the combined voltage of the batteries 100, 101, 102 and 103. The difference of potential between the line wire 114 and the track rail 107 is equal to the combined voltage of the batteries 100, 101, 102, 103 and 104, and the difference of potential between the line wire 115 and the track rail 107 is equal to the combined voltage of the batteries 100, 101, 102, 103, 104 and 105.

As the equipment for all of the blocks is similar, I will merely describe the devices relating to the block H. Connected across the track rails at one end of the block H is a track battery and connected across the track rails at the other end of the block is a track relay $109^h$. The relay $109^h$ has six neutral armatures $116^h$, $117^h$, $118^h$, $119^h$, $120^h$ and $121^h$. All of the armatures mentioned have front contacts which coöperate with their respective armatures when the relay is energized, and all of the armatures, except armature $116^h$, have back contacts, which coöperate with their respective armatures when the relay is deënergized. The armature $116^h$ is connected by a wire $122^g$ with the third rail section $56^g$, and the front contact of this armature is connected by the wire $123^h$ with the armature $117^i$. The front contact of the armature $117^h$ is connected by the wire $124^h$ with the armature $118^i$, and the back contact of the armature $117^h$ is connected by the wire $125^h$ with the line wire 110. The front contact of the armature $118^h$ is connected by the wire $126^h$ with the armature $119^i$, and the back contact of the armature $118^h$ is connected by the wire $127^h$ with the line wire 111. The front contact of the armature $119^h$ is connected by the wire $128^h$ with the armature $120^i$, and the back contact of the armature $119^h$ is connected by the wire $129^h$ with the line wire 112. The front contact of the armature $120^h$ is connected by the wire $130^h$ with the armature $121^i$, and the back contact of the armature $120^h$ is connected by the wire $131^h$ with the line wire 113. The front contact of the armature $121^h$ is connected by the wire $132^h$ with the line wire 115 and the back contact of the armature $121^h$ is connected by the wire $133^h$ with the line wire 114. Similar connections are made between the armatures and contacts of the various blocks and the line wires.

Assuming that a train is occupying the block I, the third rail sections in the rear thereof will be energized or deënergized as follows: The third rail section $56^h$ will be deënergized as its energizing circuit is broken at the front contact of the armature 169. The third rail section $56^g$ will be connected with the line wire 110 as follows: from the third rail $56^g$ to wire $122^g$, armature $116^h$, front contact, wire $123^h$, armature $117^i$, back contact, wire $125^i$, to the line wire 110. The third rail section $56^f$ will be connected with the line wire 111 as follows: from the third rail section $56^f$ to the wire $122^f$, armature $116^g$, front contact, wire $123^g$, armature $117^h$, front contact, wire $124^h$, armature $118^i$, back contact, wire $127^i$ to the line wire 111. The third rail section $56^e$ will be connected to the line wire 112 as follows: from the third rail section $56^e$ to the line wire $122^e$, armature $116^f$, front contact, wire $123^f$, armature $117^g$, front contact, wire $124^g$, armature $118^h$, front contact, wire $126^h$, armature $119^i$, back contact, wire $129^i$, to the line wire 112. The third rail section $56^d$ will be connected to the line wire 113 as follows: from the third rail section $56^d$ to the wire $122^d$, armature $116^e$, front contact, wire $123^e$, armature $117^f$, front contact, wire $124^f$, armature $118^g$, front contact, wire $126^g$, armature $119^h$, front contact, wire $128^h$, armature $120^i$, back contact, wire $131^i$ to the line wire 113. The third rail section $56^c$ will be connected to the line wire 114 as follows: from the third rail section $56^c$ to the wire $122^c$, armature $116^d$, front contact, wire $123^d$, armature $117^e$, front contact, wire $124^e$, armature $118^f$, front contact, wire $126^f$, armature $119^g$, front contact, wire $128^g$, armature $120^h$, front contact, wire $130^h$, armature $121^i$, back contact, wire $133^i$ to the line wire 114. The third rail section $56^b$ will be connected with the line wire 115 as follows: from the third rail section $56^b$ to the wire $122^b$, armature $116^c$, front contact, wire $123^c$, armature $117^d$, front contact, wire $124^d$, armature $118^e$, front contact, wire $126^e$, armature $119^f$, front contact, wire $128^f$, armature $120^g$, front contact, wire $130^g$, armature $121^h$, front contact, wire $132^h$, to the line wire 115. Similarly the third rail section $56^a$ will also be connected with the line wire 115.

It will be obvious from the above description that if the assumed train remains in the block I, a following train will have maximum voltage applied to its electromagnet 18 while it is passing through the blocks A and B, but upon entering the block C the voltage applied to the electromagnet 18 will be reduced causing the plunger 19 to drop and cam 49 to be driven to a lower permissible speed position in accordance with the movement of the vehicle. This will force the train to make a corresponding reduction in its actual speed. Similarly as the train enters the blocks D, E, F and G corresponding reductions in the speed will be required, and when the train enters the block H the electromagnet 18 will become totally deënergized and the cam 49 will be brought to its minimum position causing the train to come to an absolute stop. The system I have shown for the automatic changing of the voltage of the third rail sections along the trackway may be greatly modified and rearranged according to the nature of the permanent hazards along the trackway and for other reasons which will be obvious to those skilled in the art.

Although I have particularly described the construction of one physical embodiment of my invention, and explained the operation and principle thereof, nevertheless, I desire to have it understood that the form selected is merely illustrative, but does not exhaust the possible physical embodiments of the idea of means underlying my invention.

What I claim as new and desire to secure by Letters Patent of the United States, is:—

1. In a speed control system for railway vehicles, a track, a vehicle thereon, a permissible speed device on the vehicle, adapted to be set in a maximum speed position, a minimum speed position, and a plurality of submaximum speed positions, continuous means along the trackway for actuating said permissible speed device to move it to various positions, and means for moving said permissible speed device in accordance with the distance traveled by the vehicle, when said device has been actuated by the means along the trackway to move from a given permissible speed position to a lower permissible speed position.

2. In a speed control system for railway vehicles, a track, a vehicle thereon, a permissible speed device on the vehicle, adapted to be set in a maximum speed position, a minimum speed position, and a plurality of submaximum speed positions, an actual speed device on the vehicle, continuous means along the trackway for actuating said permissible speed device to move it to various positions, means for moving said permissible speed device in accordance with the distance traveled by the vehicle, when said device has been actuated by the means along the trackway to move from a given permissible speed position to a lower permissible speed position, means for retarding the vehicle, and means for actuating the retarding means when the actual speed of the vehicle exceeds the permissible speed corresponding to the position of the permissible speed device.

3. In a speed control system for railway vehicles, a track, a vehicle thereon, a permissible speed device on the vehicle, adapted to be set in a maximum speed position, a minimum speed position, and a plurality of submaximum speed positions, continuous means along the trackway for actuating said permissible speed device to move it to various positions, and means on the vehicle for driving said permissible speed device from the wheels of the vehicle, when said device has been actuated by the means along the trackway to move from a given permissible speed position to a lower permissible speed position.

4. In a speed control system for railway vehicles, a track, a vehicle thereon, a permissible speed device on the vehicle, adapted to be set in a maximum speed position, a minimum speed position, and a plurality of submaximum speed positions, an actual speed device on the vehicle, continuous means along the trackway for actuating said permissible speed device to move it to various positions, means on the vehicle for driving said permissible speed device from the wheels of the vehicle, when said device has been actuated by the means along the trackway to move from a given permissible speed position to a lower permissible speed position, means for retarding the vehicle, and means for actuating the retarding means when the actual speed of the vehicle exceeds the permissible speed corresponding to the position of the permissible speed device.

5. In a speed control system for railway vehicles, a track, a vehicle thereon, a permissible speed device on the vehicle, adapted to be set in a maximum speed position, a minimum speed position, and a plurality of submaximum speed positions, continuous devices along the trackway for actuating said permissible speed device to move it to various positions, means for moving said permissible speed device when said device has been actuated by the devices along the trackway to move from a given permissible speed position to a higher permissible speed position, and further means for moving said permissible speed device when said device has been actuated by the devices along the trackway to move from a given permissible speed position to a lower permissible speed position, said first mentioned means being adapted to move the permissible speed device at a higher rate of speed than said second mentioned means.

6. In a speed control system for railway vehicles, a track, a vehicle thereon, a permissible speed device on the vehicle, adapted to be set in a maximum speed position, a minimum speed position, and a plurality of submaximum speed positions, an actual speed device on the vehicle, continuous devices along the trackway for actuating said permissible speed device to move it to various positions, means for moving said permissible speed device when said device has been actuated by the devices along the trackway to move from a given permissible speed position to a higher permissible speed position, further means for moving said permissible speed device when said device has been actuated by the devices along the trackway to move from a given permissible speed position to a lower permissible speed position, said first mentioned means being adapted to move the permissible speed device at a higher rate of speed than said second mentioned means, means for retarding the vehicle, and means for actuating the retarding means when the actual speed of the vehicle exceeds the permissible speed corresponding to the position of the permissible speed device.

7. In a speed control system for railway vehicles, a track, a vehicle thereon, a permissible speed device on the vehicle, adapted to be set in a maximum speed position, a minimum speed position, and a plurality of submaximum speed positions, continuous means along the trackway for actuating said permissible speed device to move it to various positions, means including said means along the trackway for moving said permissible speed device, when said device has been actuated by the means along the trackway to move from a given permissible speed position to a higher permissible speed position, and means on the vehicle for moving said permissible speed device in accordance with the distance traveled by the vehicle, when said device has been actuated by the means along the trackway to move from a given permissible speed position to a lower permissible speed position.

8. In a speed control system for railway vehicles, a track, a vehicle thereon, a permissible speed device on the vehicle, adapted to be set in a maximum speed position, a minimum speed position, and a plurality of submaximum speed positions, an actual speed device on the vehicle, continuous means along the trackway for actuating said permissible speed device to move it to various positions, means including said means along the trackway for moving said permissible speed device, when said device has been actuated by the means along the trackway to move from a given permissible speed position to a higher permissible speed position, means on the vehicle for moving said permissible speed device in accordance with the distance traveled by the vehicle, when said device has been actuated by the means along the trackway to move from a given permissible speed position to a lower permissible speed position, means for retarding the vehicle, and means for actuating the retarding means when the actual speed of the vehicle exceeds the permissible speed corresponding to the position of the permissible speed device.

9. In a speed control system for railway vehicles, a track, a vehicle thereon, a permissible speed device on the vehicle, adapted to be set in a maximum speed position, a minimum speed position, and a plurality of submaximum speed positions, continuous means along the trackway for actuating said permissible speed device to move it to various positions, means including said means along the trackway for moving said permissible speed device, when said device has been actuated by the means along the trackway to move from a given permissible speed position to a higher permissible speed position, means on the vehicle for moving said permissible speed device in accordance with the distance traveled by the vehicle, when said device has been actuated by the means along the trackway to move from a given permissible speed position to a lower permissible speed position, and means including the means along the trackway for maintaining the permissible speed device in the position to which it has been moved.

10. In a speed control system for railway vehicles, a track, a vehicle thereon, a permissible speed device on the vehicle adapted to be set in a maximum speed position, a minimum speed position, and a plurality of submaximum speed positions, an actual speed device on the vehicle, continuous means along the trackway for actuating said permissible speed device to move it to various positions, means including said means along the trackway for moving said permissible speed device when said device has been actuated by the means along the trackway to move from a given permissible speed position to a higher permissible speed position, means on the vehicle for moving said permissible speed device in accordance with the distance traveled by the vehicle, when said device has been actuated by the means along the trackway to move from a given permissible speed position to a lower permissible speed position, means including the means along the trackway for maintaining the permissible speed device in the position to which it has been moved, means for retarding the vehicle, and means for actuating the retarding means when actual speed of the vehicle exceeds the permissible speed corresponding to the position of the permissible speed device.

11. In a speed control system for railway vehicles, a track, a vehicle thereon, a movable member on the vehicle, adapted to be set in a plurality of different positions, a permissible speed device on the vehicle adapted to be set in a plurality of permissible speed positions, each of said positions corresponding to a given position of the movable member, continuous means along the trackway for moving the movable member to various positions, means for simultaneously moving the permissible speed device and the movable member, when the movable member is moved in one direction, and means for moving the permissible speed device from one position to another in accordance with the distance traveled by the train, when the movable member is moved in the opposite direction.

12. In a speed control system for railway vehicles, a trackway divided into blocks, a continuous third rail along the trackway, divided into sections corresponding to the blocks, means responsive to the presence of a vehicle in any block for producing different electrical conditions in the third rail sections in the rear thereof, a permissible speed device on a following vehicle adapted to be set in a maximum speed position, a minimum speed position, and a plurality of submaximum speed positions, means including the third rail sections to actuate the permissible speed device to move to a lower permissible speed position as the said vehicle approaches close to the first vehicle, and means for moving the said permissible speed device in accordance with the distance traveled by the said vehicle.

LUTHER RINGER.

Copies of this patent may be obtained for five cents each, by addressing the "Commissioner of Patents, Washington, D. C."